Inventor
William H. Peterson
By Mann, Brown & McWilliams,
Attys.

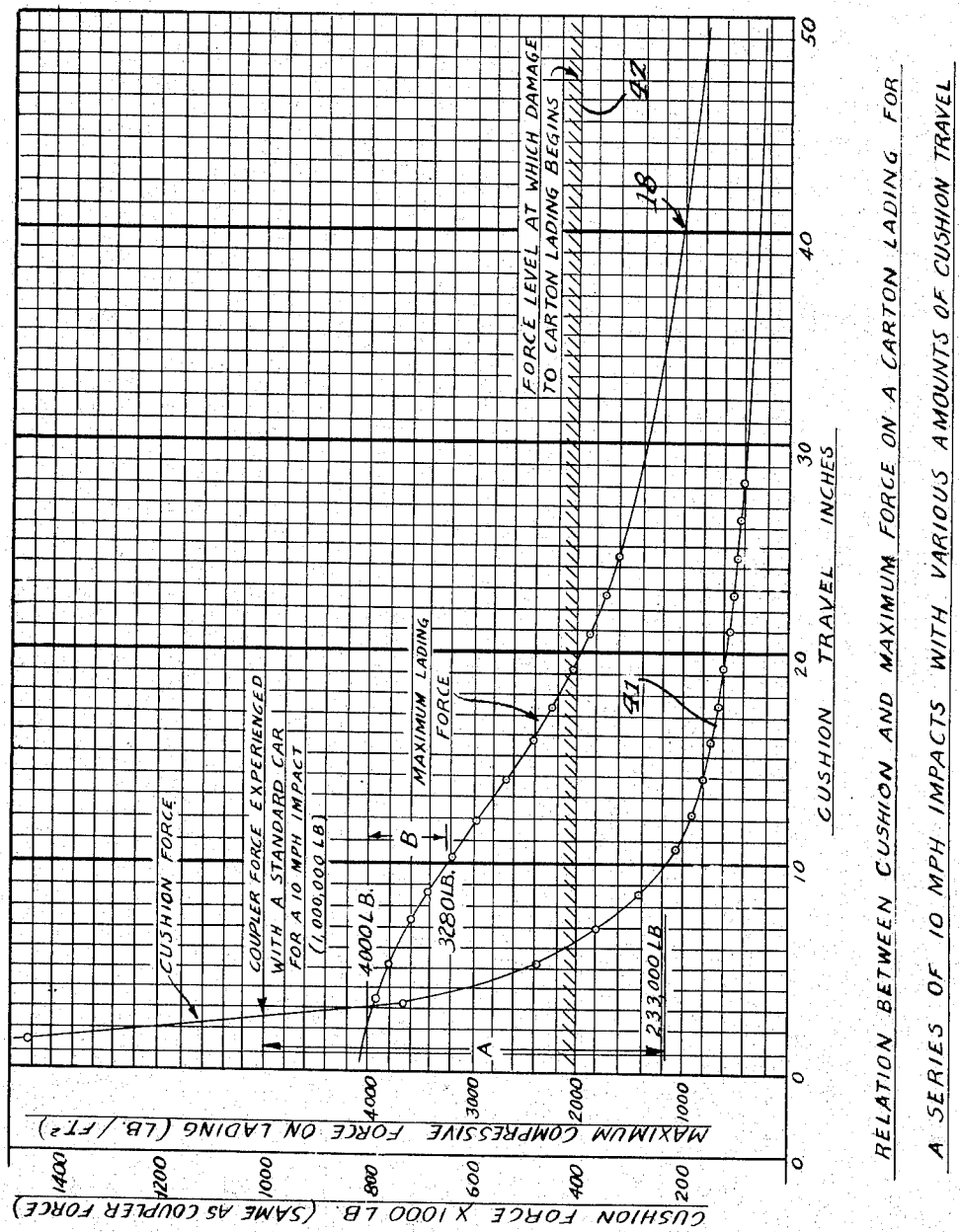

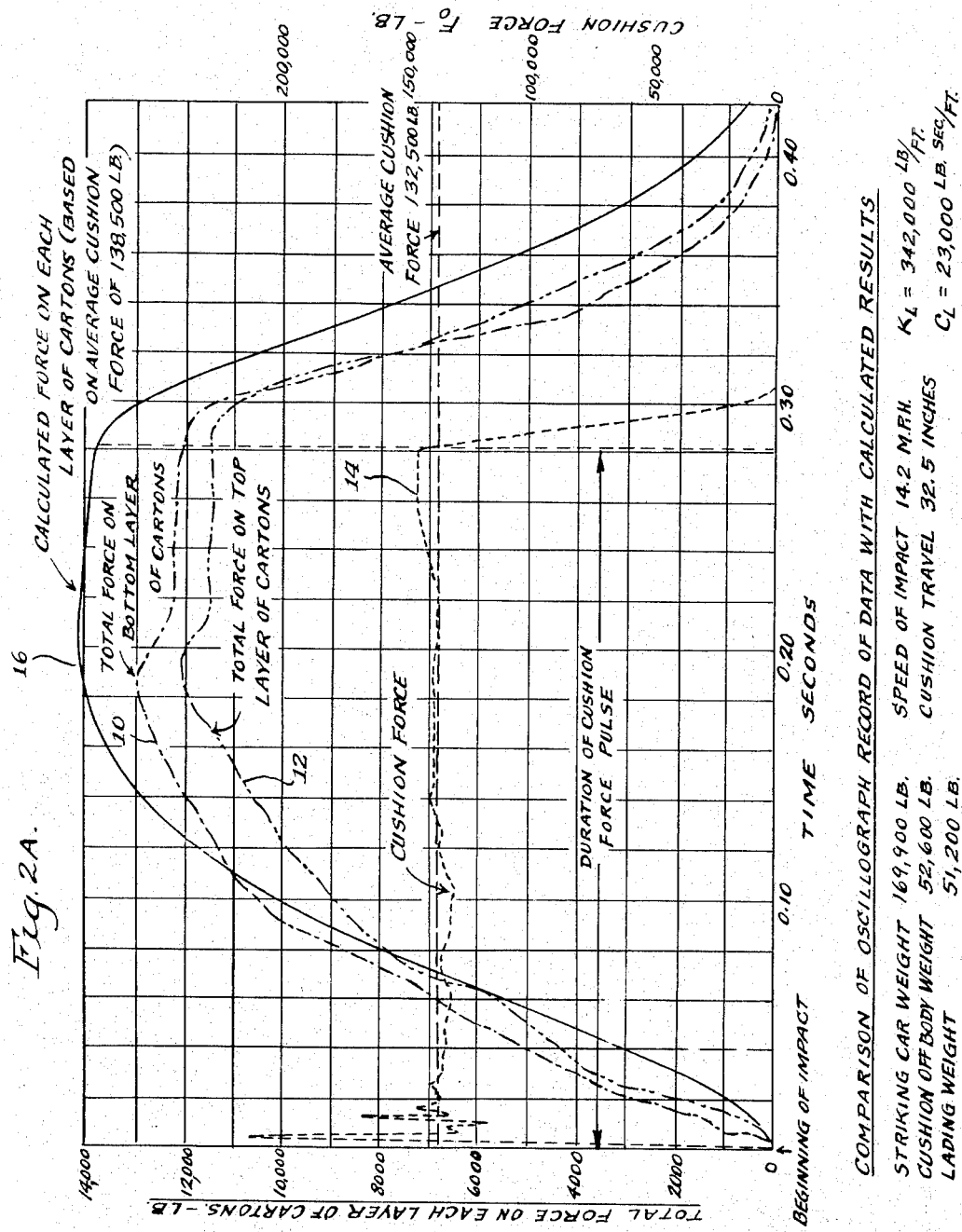

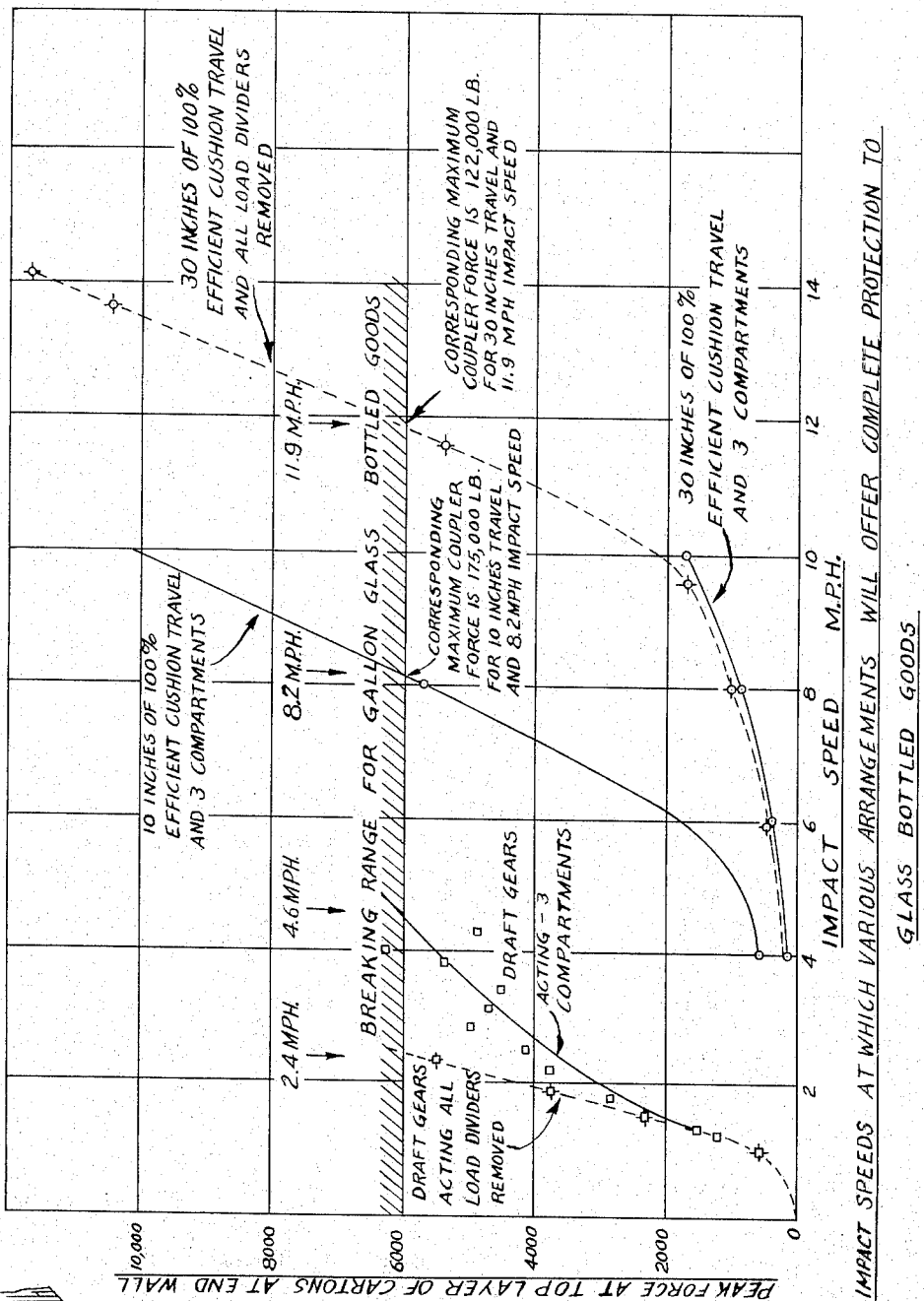
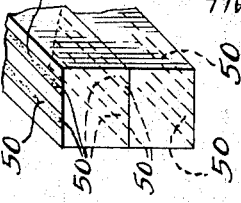

Jan. 2, 1968  W. H. PETERSON  3,361,269
APPARATUS FOR PROTECTING VEHICLE LOADS
Filed March 5, 1959  12 Sheets-Sheet 5
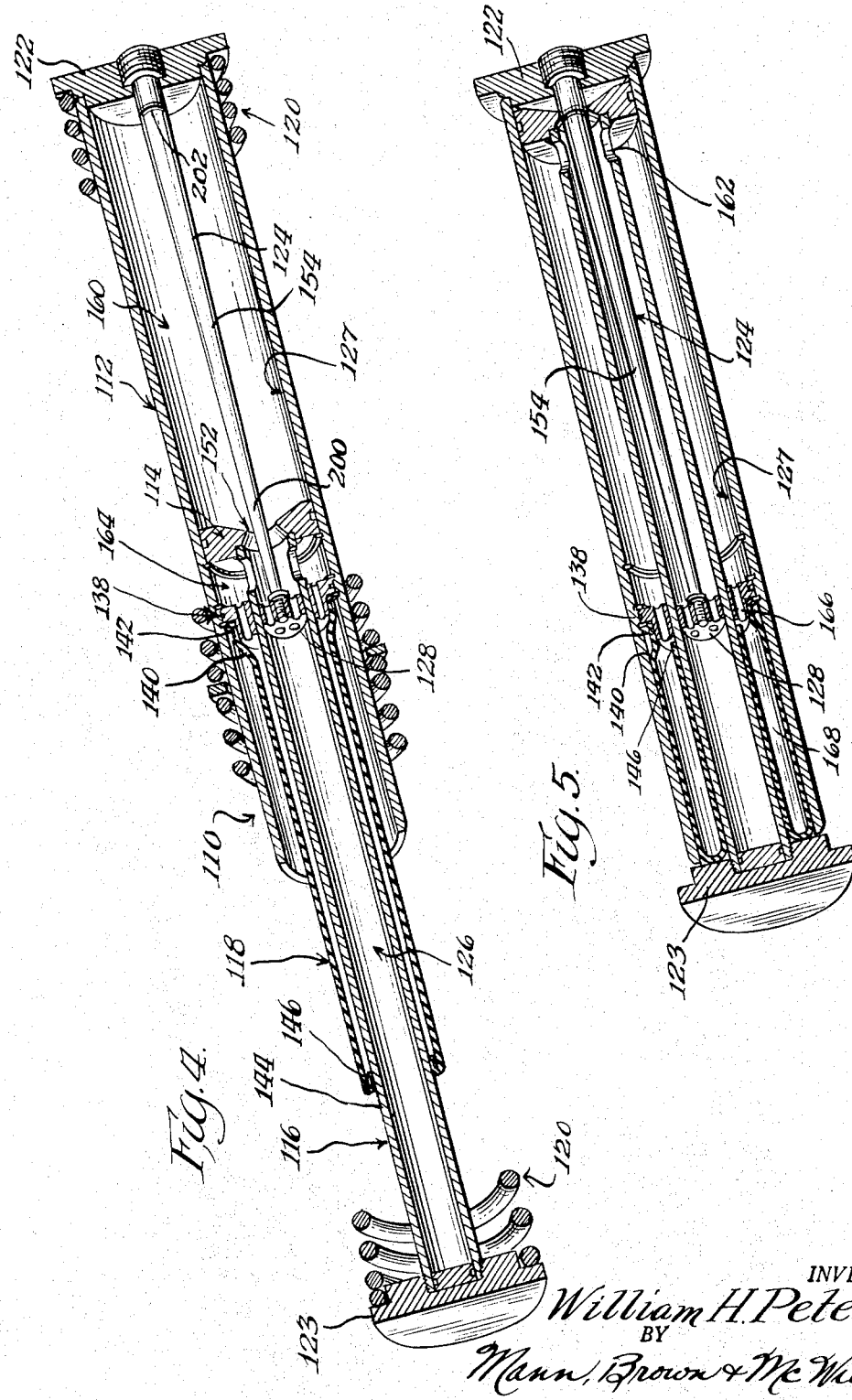
INVENTOR.
William H. Peterson
BY
Mann, Brown & McWilliams,
Attys.

INVENTOR.
William H. Peterson
BY
Mann, Brown & McWilliams
Attys

Jan. 2, 1968　　　W. H. PETERSON　　　3,361,269
APPARATUS FOR PROTECTING VEHICLE LOADS
Filed March 5, 1959　　　　　　　　　　　　12 Sheets-Sheet 7
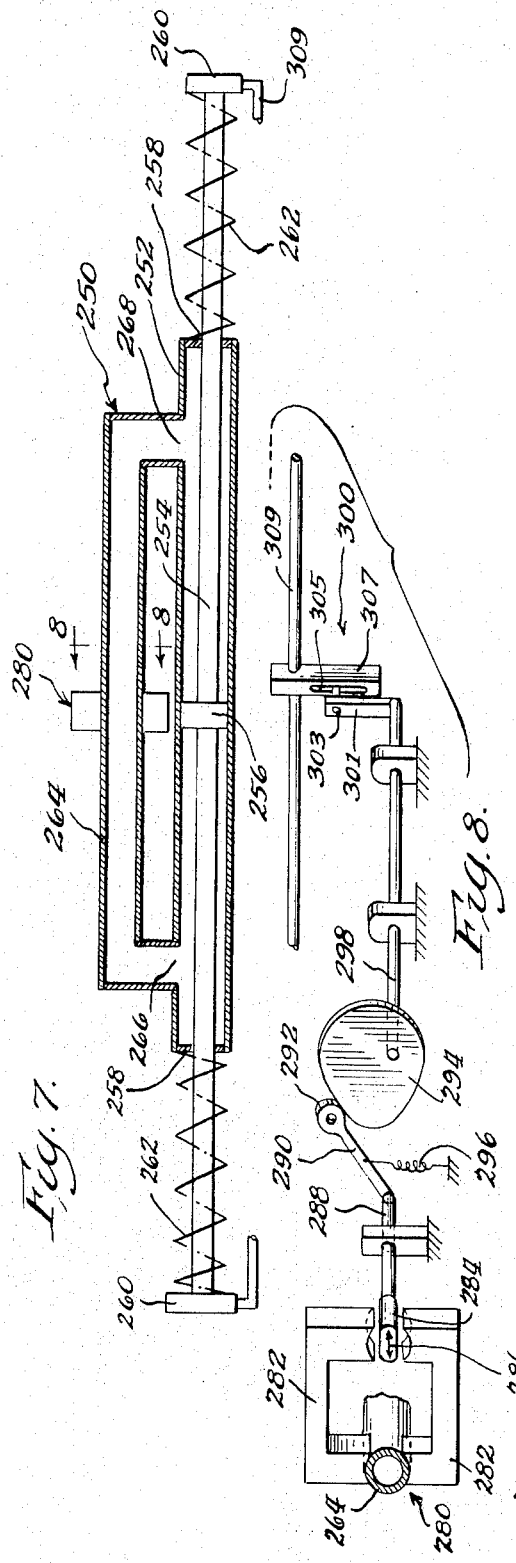
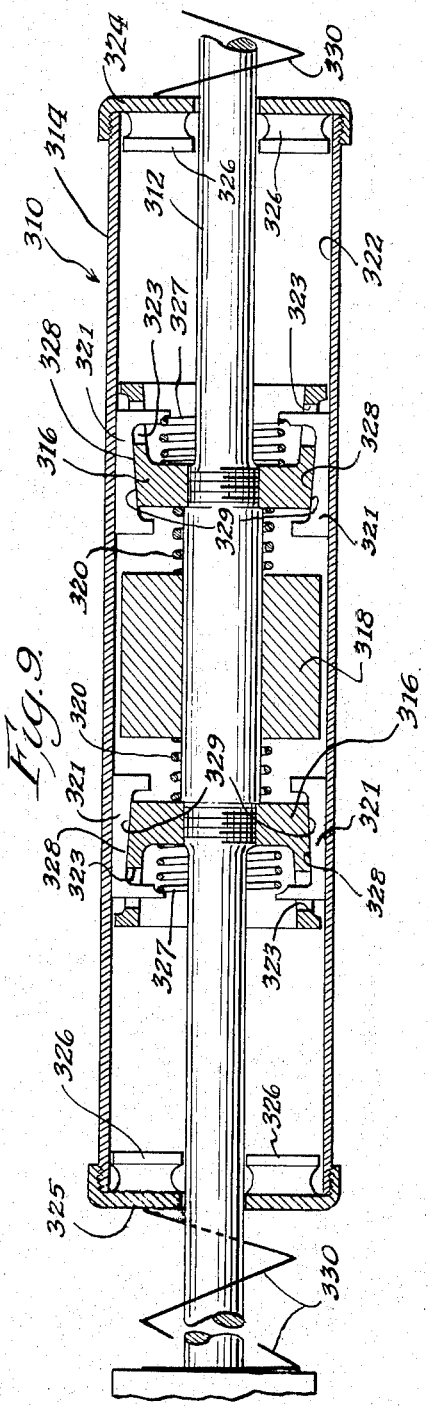
INVENTOR.
William H. Peterson
BY
Mann, Brown & McWilliams
Attys.

Jan. 2, 1968  W. H. PETERSON  3,361,269
APPARATUS FOR PROTECTING VEHICLE LOADS
Filed March 5, 1959  12 Sheets-Sheet 8
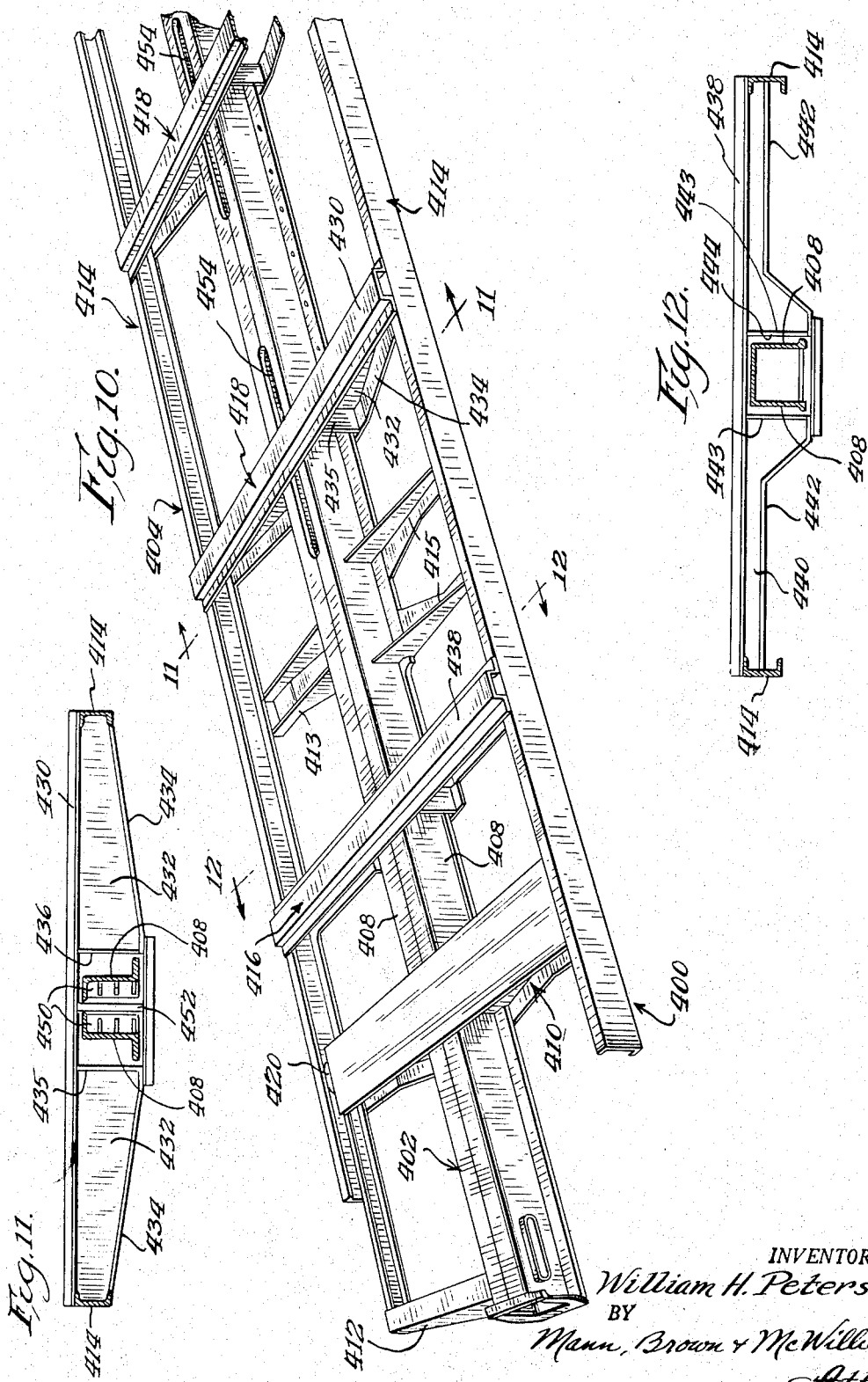
INVENTOR.
William H. Peterson
BY
Mann, Brown & McWilliams,
Attys.

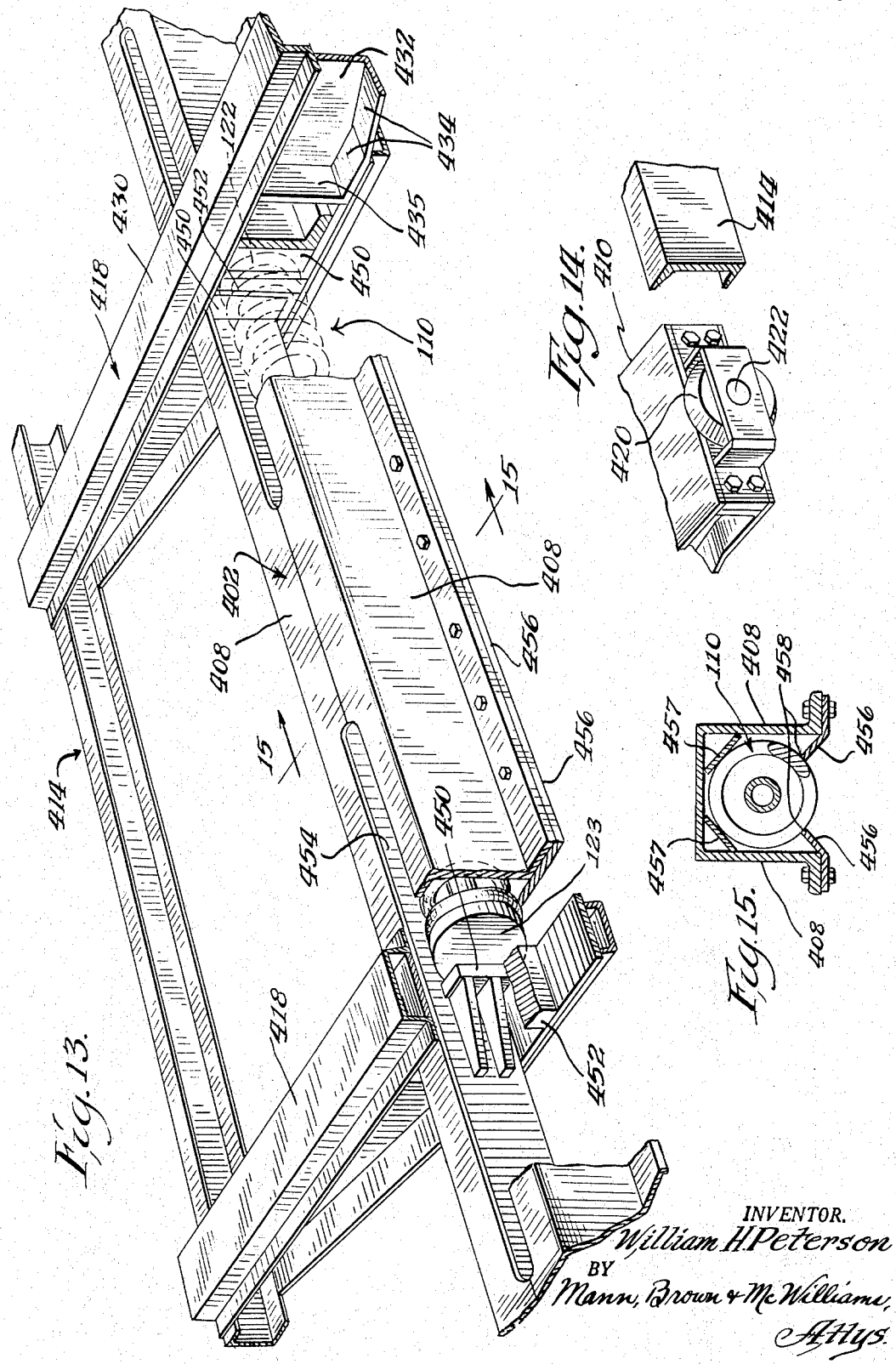

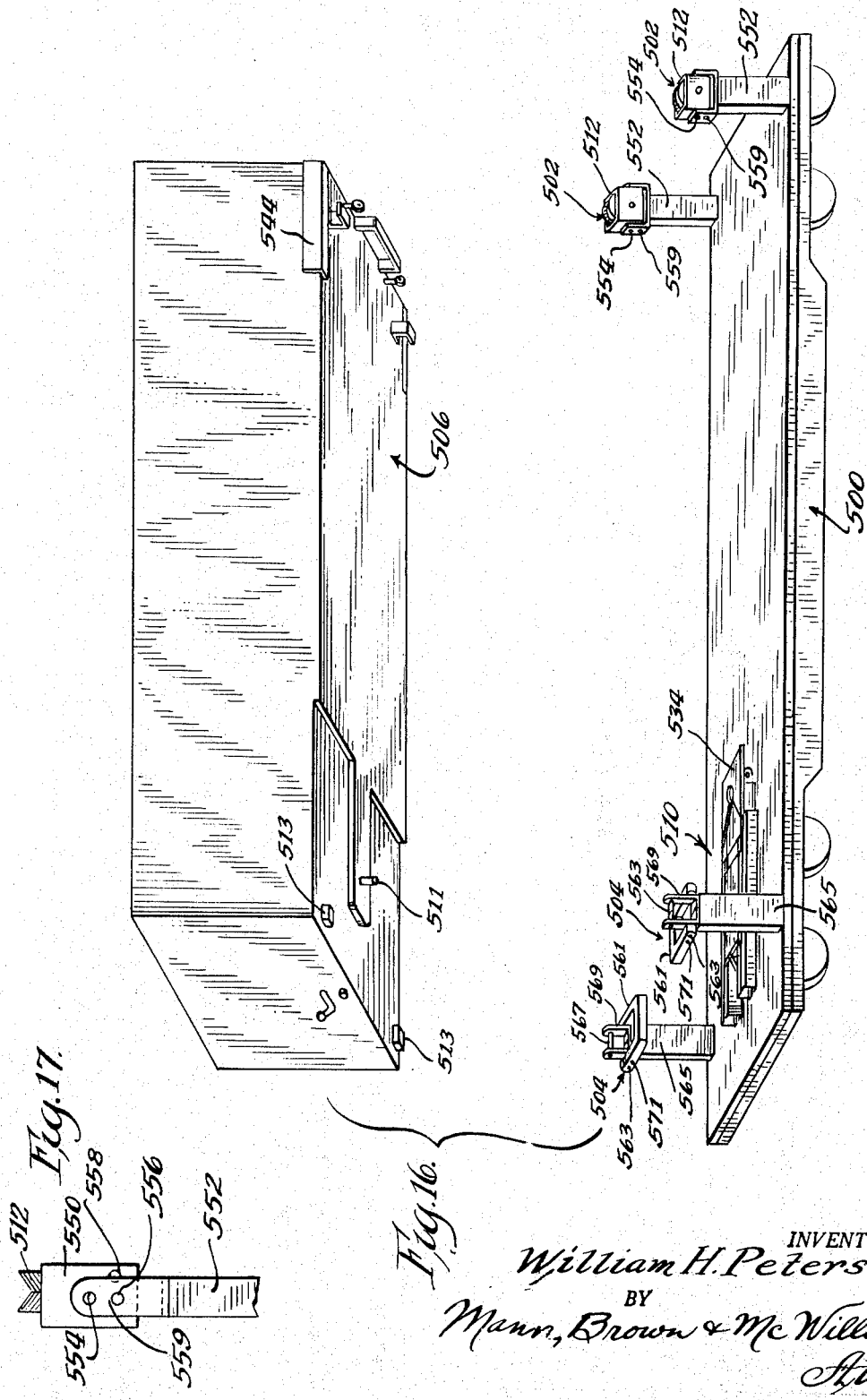

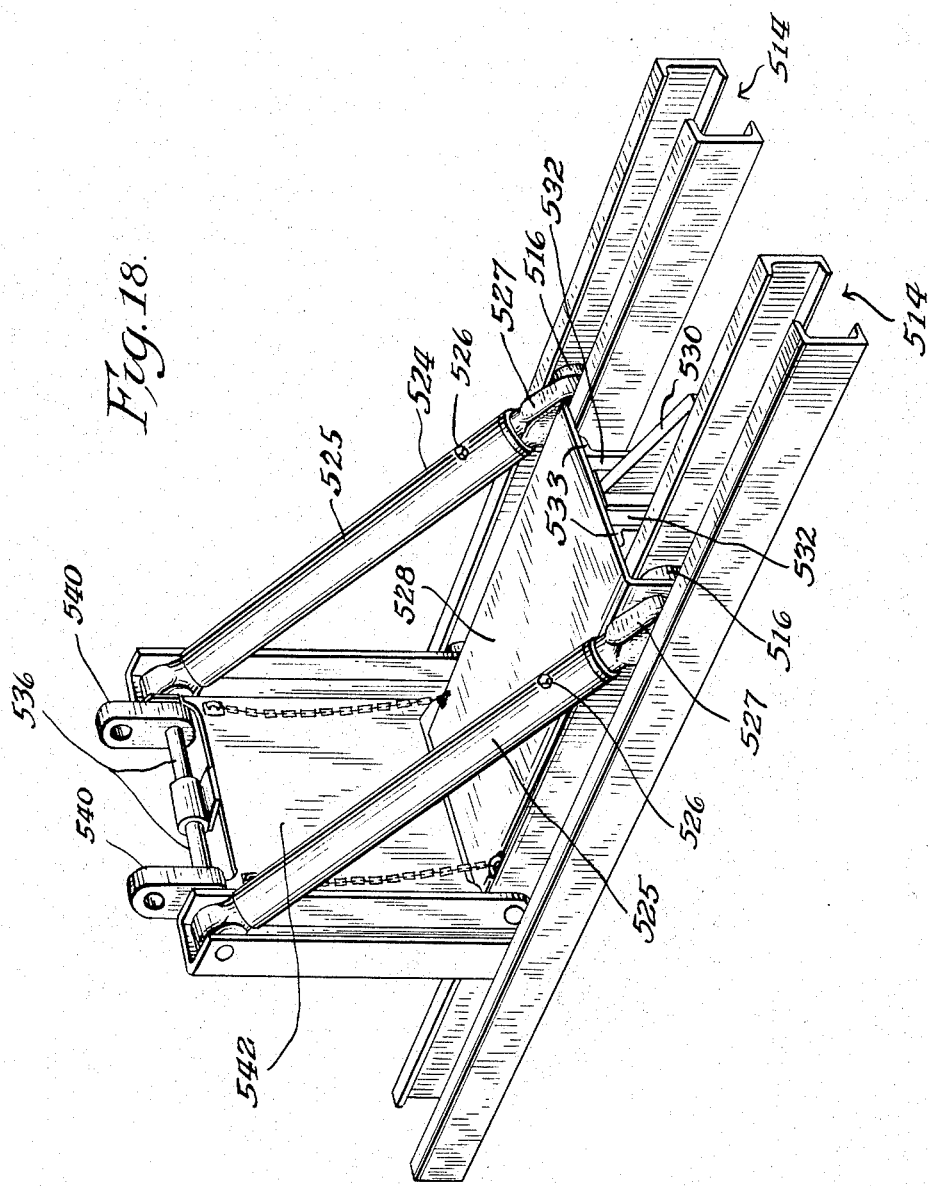

Jan. 2, 1968 W. H. PETERSON 3,361,269
APPARATUS FOR PROTECTING VEHICLE LOADS
Filed March 5, 1959 12 Sheets-Sheet 12
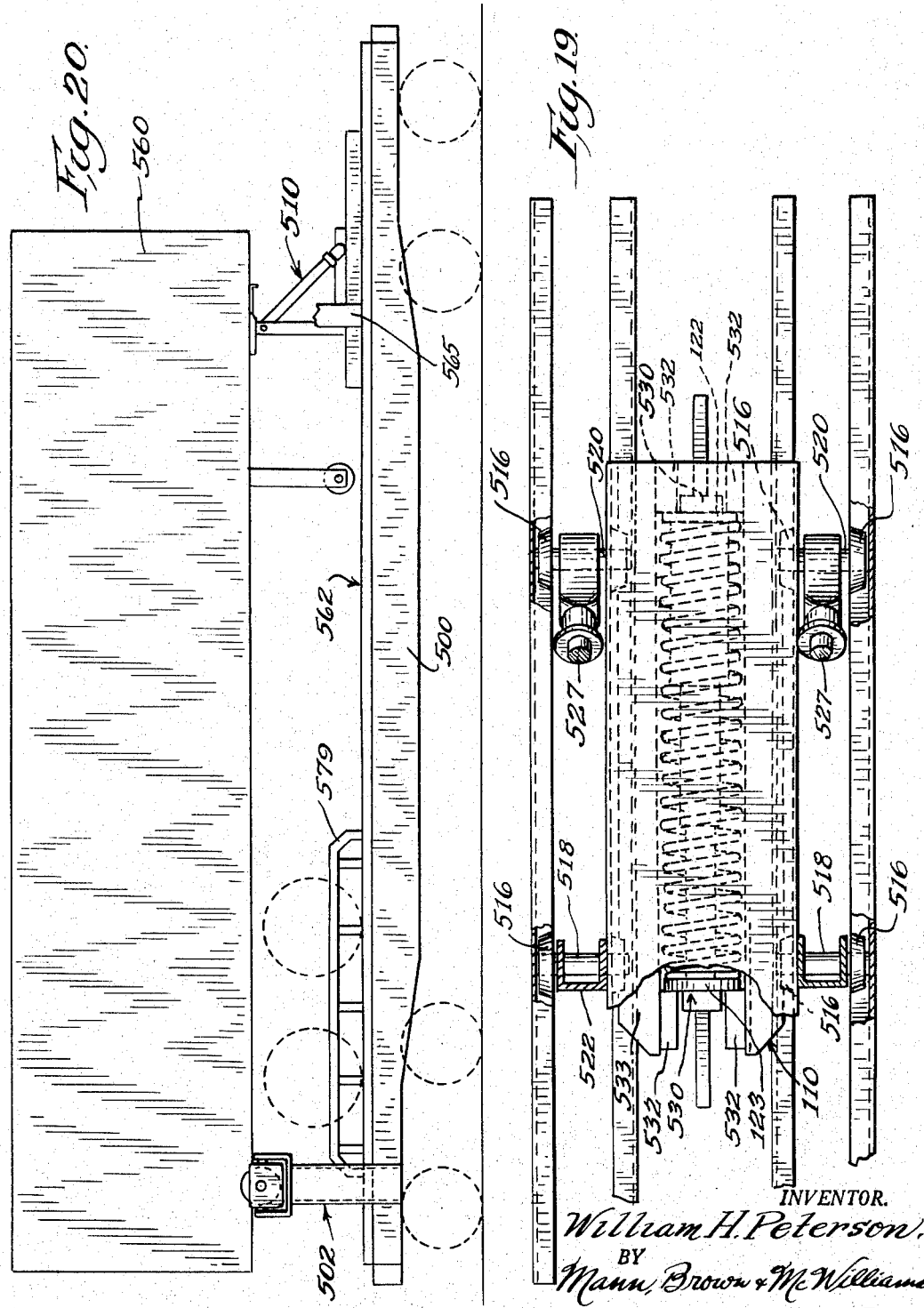
INVENTOR.
William H. Peterson,
BY
Mann, Brown & McWilliams,
Attys.

Patent 3,361,269

3,361,269
APPARATUS FOR PROTECTING VEHICLE LOADS
William H. Peterson, Homewood, Ill., assignor to Pullman Incorporated, a corporation of Delaware
Filed Mar. 5, 1959, Ser. No. 797,529
2 Claims. (Cl. 213—8)

This invention provides a new approach to the problem of damage to lading in transit, and is particularly directed to the protection of lading while being transported in or on railway cars.

While the problem, my work in solving it, and the solution afforded by this invention are closely associated with, and will be discussed in connection with, railroad freight shipment, it will be obvious that the invention has broader aspects and its benefits can be applied to various types of passenger carrying vehicles as well as freight carrying vehicles.

Statistics show that during the year 1957 the United States railroads paid out in damage claims a total of $116,213,191.00. Approximately one-third of this amount (namely, $38,700,000.00) can be attributed to damage claims for commodities packed in fibre boxes and other containers (herein referred to as "resilient lading") even though this type of commodity accounts for only one-fifth of the gross freight revenue. Furthermore, at least 75 percent of the damage to this lading is the result of coupling impact. These latter figures can be found in a report published in 1952 by the "Transportation and Packing Survey," an activity sponsored jointly by the railroads of the United States and the Fibre Box Association, and are based on inspections of 3,440 cars at destination.

Obviously, the lading damage problem is of long standing, and many attempts have been made to solve it. It has generally been thought that reducing impact coupler forces was a key to the solution in that this should result in a proportionate reduction in lading damage, but as late as Nov. 11, 1957, in the Official Proceedings of the Canadian Railway Club under that date, at page 6, may be found the following admission that the problem of lading damage is far from being solved:

"The need for more adequate protection to cars and lading has long been recognized by all concerned and efforts are constantly being made to achieve this objective. The overall problem is one of considerable complexity and although many benefits have been derived in recent years, no entirely satisfactory solution has been found.

"The vastly improved riding characteristics of freight car trucks have practically eliminated lading damage caused by vertical and lateral shocks. Improved car loading techniques have also contributed to a further reduction of lading damage. Another contribution has been made with more efficient cushioning devices designed to alleviate the damaging effects of longitudinal shocks.

"However, despite these benefits, the problem of reducing longitudinal shocks is still a long way from being satisfactorily solved. Much more concentrated study and exploration is necessary before this objective can be achieved."

Obviously, solutions to this problem to be practical must effect a substantial reduction in lading damage claims and since resilient lading accounts for one-third of all damage claim payments, the elimination of damage to this class of lading would reduce total damage claim payments by a substantial amount.

It is therefore a principal object of my invention to provide methods and apparatus that are specifically designed for the protection of resilient lading, though they will also afford maximum protection for other less critical types of lading, with consequent further savings in damage claim payments.

In a series of experiments which have been conducted under my direction for purposes of analyzing the resilient lading problem, I have found that coupler forces may be reduced as much as five fold by appropriate cushioning devices, and yet the destructive forces acting upon resilient lading (which for convenience may be called the "lading forces") are reduced only by a relatively small percentage. This means that a reduction in coupler force or an increase in sill travel (in the case of cushioned underframe cars) of even substantial amounts will not automatically result in a corresponding reduction in damage to resilient lading within present ranges of cushioned travel.

I have discovered that, when the shock of impact, applied to a car carrying resilient lading, is absorbed by a cushioning mechanism having a length of travel far in excess of the travel length customarily used, lading damage can be predictably and materially reduced. To be specific, in the case of railway freight cars I have found that when a cushioning device having substantially constant force travel characteristics operates over a distance that exceeds about eighteen inches, further reductions in coupler forces by providing still longer travel unexpectedly will result in proportional reductions in lading forces, i.e., the forces which can cause lading damage. With cushion travels shorter than this distance, the relation between coupler and lading force is unexpectedly not in corresponding proportion. It is this unexpected result which lies at the heart of my invention. This basic discovery permits predictable reductions of lading forces to safe levels by providing for the necessary cushioned travel in excess of eighteen inches. Furthermore, this discovery points up the futility of attempting to obtain adequate lading protection within conventional concepts of cushion travel even though, within this travel limitation (ten inches and under), striking reductions in coupler force are possible by designing a cushion gear which will absorb the impact energy with essentially a constant force travel characteristic.

This invention presumes that lading protection is to be accomplished by means of cushioning alone, since by compartmenting the load or otherwise restraining the load so as to reduce its resiliency, some benefits are possible within conventional cushioned travel limitations. My studies and tests have shown that resilient lading is fully protected from longitudinal shocks by a cushioned travel on the order of thirty inches, where constant force travel characteristics are employed.

More generally, resilient lading has the characteristic that it tends to compact when the car in which it is loaded undergoes impact, and my tests clearly showed that most damage to this form of lading occurred when this compacting action was at its peak. My efforts to reduce these lading force peaks led to my above mentioned basic discovery, and my work on this problem shows that when longitudinal impacts applied to a railroad car or other vehicle carrying the so-called resilient lading are absorbed over a period of time that exceeds the time it takes the resilient load to reach full compaction, further reductions in coupler force will result in proportional reductions in lading forces, whereas if the impact is absorbed over shorter periods, the reduction in lading force is increasingly less than the reduction in coupler force.

This invention is not to be confused with prior art railway cars having extensive spring or conservative energy system type cushioning means operating over long ranges of travel, where the springs merely serve to store the energy of impact and return it to the car body in the form of oscillations. Obviously, this violent shaking movement of the lading would be as disastrous as the presently used methods of absorbing impact shock through short travel high capacity draft gears and draft gears of high energy absorption.

A more general principal object of this invention, therefore, is to provide a method and apparatus for protecting the contents of a vehicle, whether it be passengers or freight of any transportable type, by absorbing the energy of impact over relatively long distances, whereby the shock forces acting on the passengers or freight, as the case may be, are materially reduced.

More specifically, and as related to railroad freight cars, an object of the invention is to absorb and dissipate the kinetic energy of impact forces, or a substantial part thereof, over a distance of from about twenty to forty inches, and preferably to accomplish this result with a kinetic energy dissipating device having substantially constant force travel characteristics.

Further and other objects and advantages of the invention will be apparent as the disclosure proceeds and the description is read in conjunction with the accompanying drawings, in which:

FIGURES 1–3 are graphs illustrating the basic principles of my invention;

FIGURE 3a is a fragmental diagrammatic perspective view illustrating how the beneficial frictional characteristics inherent in resilient lading may be accentuated;

FIGURES 4 and 5 are diagrammatic perspective views, in section, illustrating one embodiment of a preferred long travel cushion device that may be used in practicing my invention, and showing it in extended and contracted positions, respectively;

FIGURE 7 is a diagrammatic view, partially in section, illustrating a modified form of long travel cushioning unit which may be employed in practicing my invention;

FIGURE 8 is a diagrammatic view approximately along line 8—8 of FIGURE 7 but in perspective, and illustrating further details of the embodiment of FIGURE 7;

FIGURE 9 is a longitudinal sectional view illustrating a further cushioning device that may be employed in practicing my invention;

FIGURE 10 is a diagrammatic prespective view of a cushion body railroad car arrangement that may be employed in practicing my invention, to which the hydraulic cushion device of FIGURES 4–6 has been applied;

FIGURE 11 is a diagrammatic cross-sectional view approximately along line 11—11;

FIGURE 12 is a diagrammatic sectional view approximately along line 12—12 of FIGURE 10;

FIGURE 13 is an enlarged perspective view illustrating the manner in which the hydraulic cushioning unit is applied to the car structure of FIGURE 10;

FIGURE 14 is a diagrammatic fragmental perspective view illustrating the roller arrangement that is employed between the underframe and center sill of the car structure shown in FIGURE 10;

FIGURE 15 is a diagrammatic sectional view approximately along line 15—15 of FIGURE 13 further illustrating the manner in which the hydraulic cushion unit is applied to the car structure of FIGURES 10–14;

FIGURE 16 is an exploded perspective view of a railroad flatcar and freight container of a freight handling system to which my invention is applicable;

FIGURE 17 is an elevational view of one of the rear brackets of the railroad car of FIGURE 16;

FIGURE 18 is a perspective view of the fifth wheel stand unit employed on the railroad car of FIGURE 16;

Figure 6:
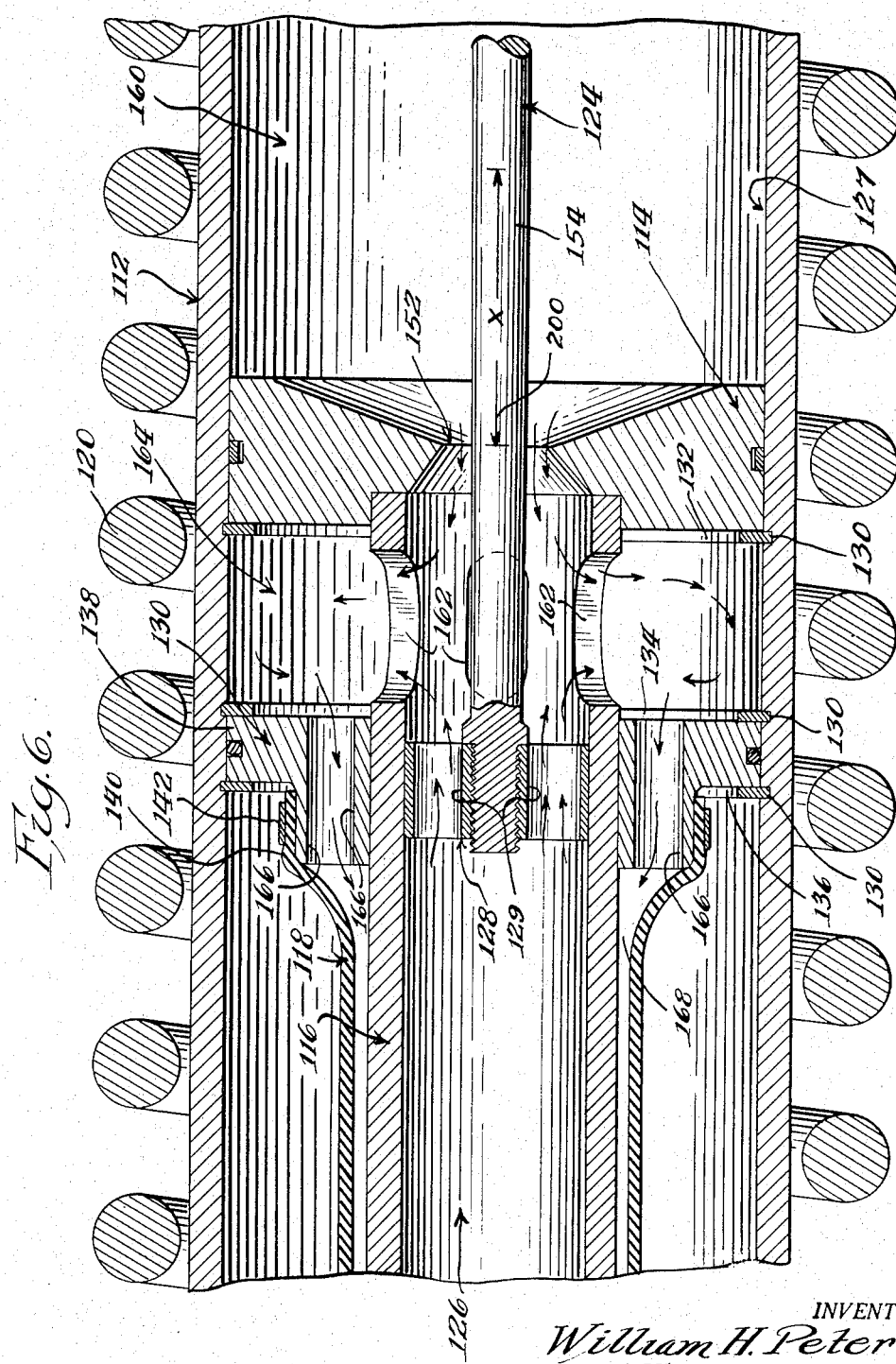
FIGURE 6 is an enlarged sectional view of the midportion of the unit as shown in FIGURE 4, illustrating the direction of the hydraulic liquid flow on initiation of the contraction stroke of the hydraulic unit.

FIGURE 19 is a plan view of the trackways and housing of the fifth wheel stand of FIGURE 18, illustrating the manner in which the hydraulic cushion unit of FIGURES 4–6 is applied to the railroad car of FIGURE 16; and FIGURE 20 is an elevational view showing a conventional semi-trailer of the type that is customarily associated with the piggyback system of transportation as mounted on the railroad car of FIGURE 16 for transport.

However, it should be understood that the specific disclosure which follows is for the purpose of complying with Section 112 of Title 35 of the U.S. Code, and the appended claims should be construed as broadly as the prior art will permit consistent with the disclosure herein made.

General statement of invention

As already mentioned, the survey referred to above shows that at least 75 percent of damage to resilient lading is the result of coupling impacts, or more specifically, impacts in which high coupler forces are generated.

For purposes of this disclosure, coupler forces are considered to be the forces seen by the coupler on impact (these forces can be measured with strain gauges set between the striking faces of the coupler and the point on the car body at which that force is immediately transmitted); they are equivalent to what is known as cushion forces, when the coupler force is completely dissipated by the cushion device employed. High coupler or cushion forces on impact for a conventional railroad car result in application of destructive compression forces on the lading, these forces being generated from the sudden change of speed as a result of an impact; the inertia of the load tends to press the load against one end of the car, depending on whether the car is stopped, put in motion, slowed down, or speeded up, by the impact. These destructive forces acting on the lading are hereinafter referred to as "lading forces" and may be measured as by employing dynamometers between the end of the car and the lading.

It would thus seem that by reducing coupler forces, lading damage should be reduced correspondingly, or even, perhaps, eliminated, with consequent reduction of the total lading damage claims by a substantial amount. Reduction of coupler forces conventionally involves a cushioning arrangement between the coupler and the load to effect reduction in coupler forces, such as may be employed in cushion underframe railroad cars.

Prior tests conducted along these lines on, for instance, conventional and cushion underframe cars each carrying a rigid lading such as building tile, showed that reduction of coupler forces by employing a cushioning arrangement between the coupler and the lading (as would be had with a cushion underframe railroad car) effected a corresponding reduction in lading damage, which necessarily indicates a substantial reduction in lading forces.

However, similar tests on similar cars containing resilient lading (for instance, glass bottles packaged in fibre boxes) have indicated that the reduction in coupler forces effected by employing a cushioning arrangement between the coupler and the lading effected no substantial reduction in damage, and thus lading forces on this type of lading remained excessively high, even though coupler forces were materially reduced.

In viewing these prior tests, it became apparent to me that there was a significant relationship between the glass bottle tests and the findings of the above referred to survey on similar lading, such as canned food and the like packed in fibre boxes, either of the solid or corrugated type. For instance, one common factor of all lading of this type is that the fibre boxes in which the lading is packed will compress on the order of one-half inch per box up to the breakage point of the lading, and the cumulative effect of this form of lading container is to create a total resilient mass of substantial proportions. This total resilient mass tends to oscillate within the car on impact in much the same manner that a spring would oscillate after being struck and released.

Thus, when a car carrying resilient lading is struck or impacted, two impacts or impulses result. The first impact is between the striking car body and the struck car body, and the second impact is between the struck car body and the lading carried thereby; the second impact is manifested by a compaction of the resilient lading, which at its peak results in the application of high compressive forces to the lading longitudinally of the car. After this compaction occurs, the lading tends to shift, as a mass, back and forth longitudinally of the car until the impetus resulting from impact is dissipated, similar to a damped mass-spring system.

This action of the resilient lading occurs whether or not it is in a stationary car hit by a moving car, or in a moving car that impacts against a stationary car, or in a moving car that impacts against a slower car or that is hit by a faster moving car.

Theoretical and mathematical analyses conducted by me on this problem showed the existence of a possibility that reduction of coupler forces alone is not the criteria insofar as resilient lading is concerned. My studies resulted in the derivation of the following formula, which theoretically makes it possible to predetermine lading forces acting on a resilient lading wherein a constant free travel cushioning action is employed to reduce coupler force:

$$F_L = (F_C)\left(\frac{M_{CL}}{M_C}\right)(X-Y)$$

In the above formula, $F_L$ is the lading force acting on the lading as the result of an impact, $F_C$ is the coupler force, $M_{CL}$ is the equivalent mass of the car and its lading as determined by the formula $M_C$ (car mass) times $M_L$ (load mass) all divided by $M_C$ plus $M_L$.

The term X is equivalent to:

$$(1-e^{-ZAT})[(\cos A\sqrt{1-Z^2})(T) + \left(\frac{Z}{\sqrt{1-Z^2}}\right)(\sin A\sqrt{1-Z^2})(T)]$$

wherein $e$ is the natural base of logarithms or 2.7182818, A equals the square root of the quotient of the spring rate (resilience) of the lading (hereinafter referred to as $K_L$) divided by the equivalent mass $M_{CL}$, Z is equivalent to the product of the equivalent viscous damping constant of the lading (hereinafter referred to as $C_L$) times A (as above defined), all divided by 2 times the spring rate of the lading ($K_L$), and T is time beginning from the instant of impact.

The term Y is equivalent to:

$$U(T-T_f)[1-e^{-ZA(T-T_f)}(\cos A\sqrt{1-Z^2}(T-T_f) + \frac{Z}{\sqrt{1-Z^2}}\sin A\sqrt{1-Z^2}(T-T_f))]$$

where $U(T-T_f)$ is the unit step function defined at page 146 of Advanced Engineering Mathematics by C. R. Wylie, Jr. (McGraw-Hill Book Co., Inc., 1951); the term $T_f$ is the duration of the particular cushion force (or coupler force) impulse under consideration beginning from the instant of impact and ending when the coupler force stops acting.

The factor $(X-Y)$ may be called the lading force factor which is dimensionless and permits the determination of peak lading forces for any particular coupler force impulse.

The above lading force formula and its factors can be derived from basic principles that are to be found in such works as Vibration Problems In Engineering by S. Timoshenko (2nd ed.), published by D. Van Nostrand Company of New York, New York; Mechanics of Vibration by H. M. Hansen and Paul F. Chenea (1952), published by John Wiley and Sons, New York, N.Y.; and Vibration Analysis by N. O. Myklestad, published by McGraw-Hill Book Co., New York, N.Y. (1956), as well as the Wylie work already mentioned. This formula will be found to be applicable to substantially all situations involving the transportation of resilient lading in or on railroad cars, and in effect is a mathematical description of what happens to the lading (on impacts) in terms of its elastic response and frictional characteristics; it is an effective tool for evaluating lading forces acting on resilient lading.

Lading tests were then conducted under my supervision which produced the data that permitted determination of the results indicated by the curves of FIGURES 1–3. These tests confirmed the accuracy of my mathematical analysis and also established that there is a threshold cushioned travel that must be achieved, for a given system of masses and condition of impact (relative velocity between two bodies) before reduction in coupler forces will result in proportionate reductions of lading forces.

These tests employed a moving striking car of 169,000 pounds gross weight and an initially stationary struck car of 52,600 pounds carrying a lading of 51,200 pounds composed of 900 cartons of canned animal food, loaded in five layers in accordance with the bonded short block pattern as designated in Union Pacific Railroad Loading Practices. Dynamometers were applied to the end wall of the car to measure dynamic compressive forces exerted on the cartons, which are the above described lading forces. The two cars were free to move after impact.

Under these circumstances, oscillograph recordings were made of the lading forces acting on the top and bottom layers of cartons during free standing impact speed of 14.2 miles per hour with a cushioned travel of 32.5 inches, and in FIGURE 2A, these recordings are indicated by broken lines 10 and 12, respectively. An oscillograph recording of the coupler force (or cushion force) was also made, which is indicated at 14. The theoretical lading forces over the test period were then calculated using the above formula and the average coupler force over the coupler force impulse period, and the results plotted to obtain curve 16, which represents the theoretical lading forces experienced by the lading as a result of the 14.2 m.p.h. impact.

It will be seen that the recorded data checks very closely with the calculated data, which clearly shows that my derived formula is basically correct. I therefore applied my derived formula to the shorter coupler force impulse ranges (as well as to impulses provided by twenty to fifty inches of cushioned travel) and developed theoretical lading force curve 18 of FIGURE 1. It was impossible to obtain lading force test data in the shorter impulse range at impacts anywhere approximating operating conditions as the lading would have been destroyed or severely damaged, and a comparative sequence of impacts in the damage region would be impossible to make.

Figure 2B:
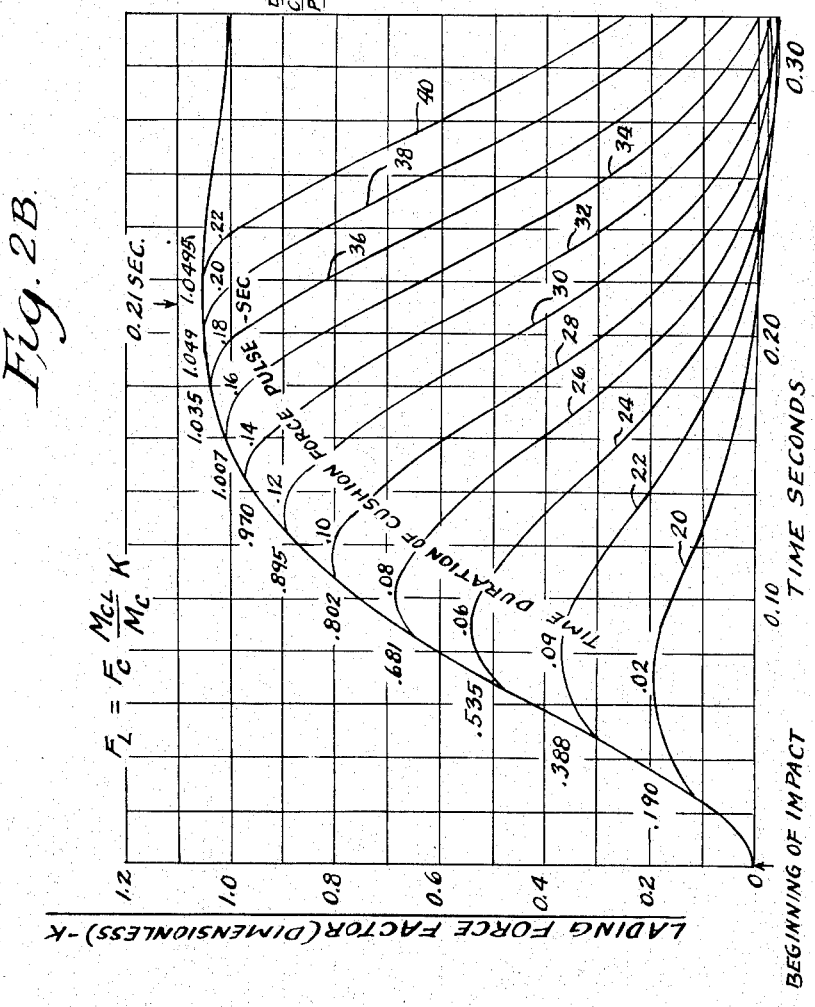

The curves of FIGURES 1 and 2B are based on the test conditions specified above, except that an impact speed of ten m.p.h. was selected as this is representative of typical existing cases, found, for instance, in humping yards. The points determining the lading force curve 18 of FIGURE 1 were obtained by employing the unit step function associated with the lading force factor $(X-Y)$ of my formula and taking specific time values for the term $T_f$, representing coupler force (or cushion) force impulses of from .02 second (providing a cushioned travel of 1.76 inches under constant force travel characteristics) to impulses equivalent in time to a cushioned travel of 50 inches (under constant force travel characteristics). For each impulse time selected (note the chart accompanying the graph of FIGURE 2B) the unit step function operated to provide the data necessary to plot the curves 20–40 that indicate the peaks of this factor for the chosen impulse periods (for example, with regard to curve 20, this involved taking suitable increments for T (time) between zero and .02 second (and beyond) and applying them to the factor $(X-Y)$ with $T_f$ being .02; the result is a series of dimensionless units which are then plotted against time to give curve 20, the remainder of these lading factor curves being plotted in like manner).

It will be noted that for the conditions specified for these calculations, the peak lading force factor occurs when the coupler force impulse has a duration of about .21 second, which the chart accompanying FIGURE 2B shows is equivalent to a cushioned travel of 18.5 inches. Coupler force impulses for longer periods will have the same maximum lading force factors. As the maximum lading force factor occurs at the point of maximum compaction of the lading during the application of coupler force impulses to the railroad car, it will be apparent that, for all cushioned travel exceeding 18.5 inches (in the system of masses under consideration), the lading force factor and compaction of the lading reach their maximum at 18.5 inches of travel, for lading having the particular elastic properties used in this test.

The impulse factor peaks indicated by curves 20-40 were then read directly from the graph and individually applied to my derived lading force formula in place of the factor $(X-Y)$, and the resulting lading force values, when plotted against the length of cushioned travel corresponding to the coupler force impulses selected, resulted in curve 18 of FIGURE 1.

The theoretical coupler forces involved in the curves of FIGURE 1 were found by employing the law of conservation of momentum, as expressed by the equation applicable to inelastic bodies (as railroad cars are essentially inelastic bodies):

$$M_1 V_1 = (M_1 + M_2) V_2$$

wherein $M_1$ is the mass of the striking car (or $$169,900/32.2 = 5280),$$

$V_1$ is the striking cars velocity (10 m.p.h.), $M_2$ is the mass of the struck car and its load (103,800/32.2=3220) and $V_2$ is the combined velocity of the cars after impact. By rearranging the terms $$V_2 = \frac{M_1}{M_1 + M_2}(V_1)$$

whereby $V_2 = 9.09$ ft./sec. for the system for masses and impact speed under consideration.

Since mass times velocity equals momentum, $(M_2)(V_2)$ is equivalent to the momentum gained by the struck car (as it was initially stationary) or $(3220)(9.09) = 29,250$ lb.-sec.

We also known from Newton's Second Law of Motion that when an unbalanced force F acts for a time T upon a body of mass M, changing the velocity of the body from $V_O$ to $V_F$ the relation between these terms is:

$$F = MA = M\frac{(V_F - V_O)}{T}$$

Thus, $FT = (M)(V_F - V_O)$, and the product FT is known as an impulse, which is numerically equivalent to the change in momentum.

In the system of masses and impact speed under consideration, the coupler force $F_C$ is the unbalanced force, whereby $F_C T = M_2 V_2 = 29,250$ lb.-sec. Thus, $F_C$ may then be computed for the different values of T appearing in the chart of FIGURE 2B, and applied to my lading force formula to provide the lading force data.

The length of cushioned travel (under constant force-travel conditions) for any particular coupler force may then be determined from the fundamental expression $$F_C = \frac{V^2}{2d}(M_e)$$

wherein $d$ is the distance of cushioned travel, V is the impact speed, and $M_e$ is the equivalent mass of the striking car and the loaded struck car. The data obtained by employing the last two formula is plotted to provide the coupler force impulse curve 41 of FIGURE 1.

Parenthetically, it may be mentioned that all the above mentioned formula were used in computing the theoretical data employed for plotting lading force curve 16 of FIGURE 2A.

A study of FIGURE 1 shows that when ten inches of travel are employed, which is the maximum contemplated by conventional approaches to the problem, coupler forces are reduced from the 1,000,000 pounds experienced by a car with only draft gear protection to 233,000 pounds or 77 percent (as indicated by double headed arrow A), while lading forces are reduced only from 4,000 pounds to 3280 pounds or only 18 percent. It will also be noted that at about twenty inches of travel the lading forces fall below the damage level (to canned goods packed in fibre boxes) indicated by line 42.

My calculations show that (for the test conditions forming their basis) when sufficient cushioned travel is employed to obtain the maximum peak lading force factor indicated in FIGURE 2B, and thus maximum compaction of the lading, further cushioned travel (and corresponding or reduction of coupler forces) result in proportionate reductions in lading forces. This minimum cushioned travel for the conditions indicated is about 18.5 inches. FIGURE 1 indicates that the travel should be increased to exceed twenty inches to bring the lading forces well below the force level at which damage begins. Tests show that a cushioned travel on the order of thirty inches will afford adequate protection to the aforementioned resilient lading under all ordinary impact conditions customarily encountered in transporting freight by rail.

Cushioned travel beyond forty inches presents design problems that outweigh any benefits from further lading force reduction; furthermore, curve 18 approaches a straight line beyond a travel of about 32 inches, indicating approaching diminishing results. Consequently, a cushioned travel beyond 40 inches is not recommended.

Similar calculations for the same struck car carrying a 95,600 pound load of similar lading, arranged in seven layers in the same manner specified above indicate that the lading force curve leaves the damage range indicated by line 42 at about 22.5 inches of cushioned travel and that travel much in excess of 35 inches is not warranted because of rapidly diminishing returns. Since a resilient lading load of 95,600 pounds is near the top limit that is customarily loaded because of car capacity, it is apparent that my formula is applicable to any loads of resilient lading normally encountered in railroad service.

While the foregoing analysis applies to a striking car that impacts against a struck cushioned car which is free to move, the beneficial results indicated are clearly applicable where the struck car is not free to move, or where both cars are moving at the time of impact (which impact in any event will be reflected as a coupler force acting for a given time duration).

The graph of FIGURE 3 illustrates free standing impact speeds at which various arrangements will offer complete protection to resilient lading in the form of canned food packed in fibre cartons. In making the tests that resulted in the curves of FIGURE 3, compartmentation was employed which involved the use of removable compartmentizers that in effect divided the resilient lading into separate compartments. The figures from which the graph of FIGURE 3 was developed, resulted from tests employing the same system of masses previously described including a moving stirking car of 169,000 pounds gross weight and an initially stationary struck car of 52,600 pounds carrying a lading of 51,200 pounds composed of 900 cartons of canned animal food. Again, dynamometers were applied to the end wall and an intermediate bulkhead of the car to measure dynamic compressive forces exerted on the cartons, which are the above described lading forces. The two cars were free to move after impact.

It will be noted that when such a struck car employs thirty inches of 100 percent cushioned travel (which means travel of a constant force-travel type that completely dissipates impact enery) and in which all load dividers or compartmentizers were removed, the lading, even if it were glass bottled goods packed in fibre cartons, could withstand an impact of 11.9 miles per hour (the lading tested was undamaged after the 14.2 m.p.h. impact previously mentioned). This is to be compared to the situation where only draft gears are acting as the cushioning means and all compartmentizers are removed, wherein the maximum impact speed that could be safely made is 2.4 miles per hour. Draft gears on the average will provide a cushioned travel on the order of four and one-half inches.

It may be mentioned at this point that there is an inherent friction in a load which helps the load to protect itself and this is true even with respect to resilient lading. The use of compartmentizers minimizes this inherent benefit so that lading forces are not reduced in direct proportion to the number of compartments used. Compartmentizers achieve their greatest effectiveness with shorter cushioned travels since in such cases the car is so highly accelerated or decelerated that most of the beneficial inherent friction in the load is lost anyway.

The inherent friction of resilient lading may be accentuated by applying strips of gritty material or the like on tops and bottoms of the cartons, as indicated at 50 in FIGURE 3a, so that strips 50 of adjacent superposed cartons engage each other. Strips 50 are applied to extend longitudinally of the car and may comprise any sticky substance, such as glue, to which a gritty substance such as sand has been applied. Alternatively, strips 50 may take the form of a suitable adhesive tape to the back of which sand or other grit is bonded.

If cushioning is used which does not have a constant force-travel characteristic, the values of required cushioned travel will be greater depending upon how much the force-travel characteristic differs from constant values. An analysis of this condition would be quite complicated, but, in any event, so long as the travel employed for any cushioning arrangement is in excess of twenty inches (when dealing with railroad cars carrying resilient lading), lading forces may be reduced below dangerous maximums by effecting reductions in coupler force. Tests have indicated that where the constant force-travel characteristic is employed in a cushioning device, a cushioned travel on the order of thirty inches provides the most all around beneficial results, and that the constant force-travel characteristic results in the least possible travel to accomplish a given result.

The actual amount of travel employed in any specific situation will depend upon the characteristics of the load carried as well as the mass of the load and its carrying vehicle and the impacts to be resisted.

*Energy dissipating devices suitable for use in practicing my invention*

FIGURES 4-9 illustrate several different types of long travel kinetic energy transferring and dissipating cushion devices that may be employed to provide the constant force travel characteristic that is desirable in practicing my invention. The device of FIGURES 4-6 is the hydraulic cushion device disclosed and claimed in my copending application Ser. No. 782,786, filed Dec. 24, 1958, now Patent No. 3,035,827 the disclosure of which is hereby incorporated by this reference. The device of FIGURES 7 and 8 is a hydraulic cushion device employing a magnetic action on magnetic particles in an oil bath, while the device of FIGURE 9 is a friction shoe type energy dissipating device.

Reference numeral 110 of FIGURES 4 and 5 generally indicates the hydraulic unit of my said copending application, which generally comprises a tubular cylinder 112 in which a piston head 114 is reciprocably mounted, a tubular piston rod 116 fixed to the piston head 114, an invaginating tubular member or boot 118 connected between the tubular cylinder 112 and the tubular piston rod 116, and helical compression springs 120 extending between the closure members 122 and 123 of the tubular cylinder 112 and tubular piston rod 116, respectively.

The closure member 122 of tubular cylinder 112 carries a metering pin 124 that is reciprocably received within the bore 126 of the tubular piston rod 116. The metering pin 124 preferably is provided with a guide member 128 (see FIGURE 4) at its projecting end.

The internal surface 127 of tubular cylinder 112 is formed in any suitable manner as at 130 to receive three snap rings 132, 134 and 136. The snap ring 132 serves as a stop for piston head 114 when the device is in its extended position of FIGURE 1, while the snap rings 134 and 136 hold in place a piston rod guide member 138 to which one end 140 of the invaginating boot or tubular member 118 is secured by a suitable clamp 142. The other end of boot 118 is turned outside in, and is secured to the external surface 144 of the piston rod 116 by a suitable clamp 146.

The device 110 is charged with hydraulic liquid as described in said copending application to completely fill the space defined by the tubular cylinder 112, the tubular piston rod 116 and the invaginating boot 118. When the device is in use, as when employed as a cushion unit for a cushion underframe of a railroad car, the normal positioning of the device components is that shown in FIGURES 4 and 6, the device being mounted between suitable abutments (not shown in these figures), as is customary in this art. When the cushion underframe receives a shock in either buff or draft, either the tubular cylinder 112 will commence movement to the left of FIGURE 4 or the tubular piston rod 116 and piston head 114 will commence movement to the right of FIGURE 4, or possibly both movements may occur. In any event, as the device 110 retracts under the force being cushioned, the metering pin 124 displaces hydraulic liquid contained within the tubular piston rod 116 and the piston head 114 causes a hydraulic liquid flow through its orifice 152 through which the metering pin 124 extends. The metering pin is preferably provided with a tapered surface 154 that is designed to provide the aforementioned constant force travel characteristic as the hydraulic cushion contracts under the shock imposed upon it; that is, the arrangement is such that for every unit of travel, the cushioning device provides a substantially constant cushioning effect.

As best shown in FIGURE 6, the oil flow then initiated is from chamber 160 on the high pressure side of piston head 114 through orifice 152 and into the bore 126 of tubular piston rod 116, thence radially outwardly of the piston rod 116 through orifices or ports 162 of the tubular piston rod. As the hydraulic liquid within the tubular piston rod is displaced by the metering pin 124, it likewise moves through ports 162, as indicated by the arrows. Metering pin guide member 128 is formed with relatively large apertures 129 to permit a free flow of hydraulic liquid during movement of the metering pin.

The hydraulic liquid flow through ports 162 is under relatively high velocity and creates great turbulence in the chamber 164 that is formed by the space between tubular piston guide member 138 and piston head 114. This great turbulence is caused at least in part by the radially directed flow of hydraulic liquid impinging directly against the inner surface 127 of tubular cylinder 112, and is responsible for dissipation of much of the kinetic energy of the hydraulic liquid in the form of heat.

As the contraction of the cushion device 110 proceeds, the high pressure chamber 160 is reduced in volume by the advancement of the piston head 114 toward the tubular cylinder closure member 122. The hydraulic liquid passing through orifice 152 fills the chamber 164 behind the piston head 114, while a volume of hydraulic liquid equivalent to that displaced by the total entry into the fluid chamber of the piston rod 116, passes through apertures 166 of guide member 138 into the space 168 enclosed by the invaginating boot or tubular member 118 which inflates or expands and rolls to the position suggested by FIGURE 5. The apertures 166, as seen in FIGURES 4 and 5, are relatively large in cross-sectional area, which provides or permits a relatively large volume and consequently low pressure hydraulic liquid flow from chamber 164 to space 168. This avoids generation of any appreciable compresisve force on the relatively slender metering pin and prevents any possibility of it buckling.

After the shock has been fully dissipated, compression springs 20, acting in tandum, return the hydraulic cushion components to the intial extended position of FIGURE 4. During this movement under the action of the compression springs, the oil flow illustrated in FIGURE 6 is reversed, and invaginating tubular member or boot 118 deflates and returns to the position of FIGURE 4, thereby insuring that the hydraulic liquid displaced by the piston rod 116 is restored to its normal operative locations.

It will thus be seen that not only is the device 110 composed of few and simple components, and that all sliding or dynamic seals have been eliminated in favor of static seals, but a reliable doubleacting long travel cushioning action is provided. Furthermore, all kinetic energy applied to the cushion device, with the exception of the small amount of energy stored in the return springs is either dissipated in the form of heat by the passing of the hydraulic liquid through orifice 152 and the turbulence in chamber 164, or is transferred as kinetic energy to the struck car with its load; and, as brought out in my said copending application Ser. No. 782,786, now Patent No. 3,035,827 device 110 is hermetically sealed against hydraulic leakage and entry of ambient air.

Reference may be had to my said copending application for a more specific description of this unit. It may be added, however, that the tapering surface 154 of the meering pin 124 extends between points 200 and 202 (see FIGURES 4 and 5), and that the contour of tapered surface 154 in the illustrated embodiment is designed from the relationship $$A_x = A_o \sqrt{1 - \frac{x}{d}}$$

wherein $A_x$ is the orifice area of any position $x$ (see FIGURE 6) over the total nominal stroke $d$ (the length of the tapered surface 154), and $A_o$ is the initial orifice area defined by orifice 152 at the beginning of a stroke, in the case where a completely rigid body is being cushioned from impact. While in most cases and for a given car weight this assumption will result in a reasonably efficient design, small alterations can be readily made to this shape to give a closer approach to the optimum constant force travel characteristic for a given situation after a few experimental trials. However, the shape given by the above formula is the best starting point. Furthermore, it is usually possible to obtain a reasonably efficient design by approximating the curved shape given by the above expression as by calculating a series of spaced cross-sectional areas of the pin 124 and connecting the cross-sectional areas so determined by straight tapers, if this facilitates manufacture. Moreover, the pin could be contoured so as to provide for the desired 30 inch stroke while having a reserve stroke which would give a substantially higher force travel characteristics than that throughout the normal stroke, in order to protect against overloads or other unusually severe condition. In fact there is no limit to the possibilities of how the pin might be shaped to suit special situations or the application of existing knowledge of this art. The orifice areas referred to are the orifice areas of orifice 152 minus the cross-sectional area of the metering pin at any given position along the stroke of the metering pin.

The components of the unit 10 may be formed from any suitable materials, boot 118 being formed from neoprene-Buna N type rubber with special additives for low temperature flexibility and clamps 142 and 146 being of the type of clamp sold under the trademark "PUNCH-LOK", made and sold by the Punch-lok Company of Chicago, Ill. The unit 110 is preferably charged with the high viscosity index oil sold by Shell Oil Company under the trade designation AEROSHELL No. 4, as this oil desirably has a relatively small variation in viscosity between the extremes of minus 60 degrees F. and 150 degrees F.

The hydraulic liquid when the device 110 is in fully extended position is under very little pressure, perhaps no more than 2 p.s.i., but even though the pressures in the high pressure chamber 160 may rise to as much as 8,000 p.s.i. as when the device is employed in railroad cars to cushion buff and draft forces, the maximum pressure within the invaginating boot 118 (when fully inflated) is believed to be about 6 p.s.i. Boot 118 stretches about 100 percent when fully inflated. Units 110 can be designed for operating pressures up to the limit of the yield strength of cylinder 112 and the device of FIGURE 4 and 5 when employed in a cushion car structure, for instance, of the type shown in FIGURE 10, is capable of absorbing kinetic energy on the order of a million foot pounds, depending, of course, on the specific design required for a specific purpose. Units 110 will thus easily absorb 15 miles per hour impacts when applied to, for instance, the railroad cushioned body car structure of FIGURE 10.

The unit 250 of FIGURES 7 and 8 comprises a housing member 252 in which operating rod 254 is reciprocably mounted carrying piston head 256. The operating rod 254 extends through sealed openings 258 of the housing 252 and may terminate in flanged ends 260 against which suitable abutments (not shown) are placed. Appropriate compression springs may be applied where indicated at 262 between flanged ends 260 and the housing 252. The housing 252 includes flow conduit 264 connected as at 266 and 268 with housing 252. The space defined by housing 252 and conduit 264 is charged with hydraulic liquid such as oil containing a multitude or metallic or magnetizable particles having a particle size on the order of talcum powder. A magnetic device generally indicated at 280 is positioned on either side of conduit 264 (see FIGURE 8), device 280 being illustrated as including arms or links 282 formed from magnetic material and having their ends spaced apart somewhat as shown to receive the conduit 264 and a rotatable permanent magnet 284 magnetized in the direction indicated by double headed arrow 286. For purposes of illustration, the magnet 284 is shown fixed to rotatably mounted shaft 288 carrying an arm 290 having a cam wheel 292 that is biased against a suitable cam 294 by tension spring 296. Cam 294 may be actuated through an appropriate rotatably mounted shaft 298 by any suitable control apparatus, such as that illustrated diagrammatically at 300. Apparatus 300 may comprise an arm 301 fixed to shaft 298 and carrying pin 303 which is slidably received in slot 305 of arm 307 fixedly carried by rod 309 that may, for instance, be fixed between flanged ends 260 of operating rod 254; conduit 264 should be formed from a non-magnetic material that is permeable to magnetism, such as aluminum.

Prior to impacts, the magnet 284 will be in the position indicated in FIGURE 8 so that the magnet lines of force will not extend through the magnetic device 280 including its arms 282, as well as the conduit 264. When an impact is applied to, for instance, operating rod 254, it will move either to the right or to the left of FIGURE 7, thereby forcing hydraulic liquid through conduit 264 to the other side of the piston. Movement of operating rod 254 will effect rotational movement of magnet 284 to gradually align its magnetic field with arms 282 and effect a corresponding gradual increasing restriction on the oil flow through conduit 264 by reason of the increased magnetic field through which the oil must flow. The increasing restriction on oil flow during the cuhioning action of device 250 is effected by the magnetizing action of the magnetic field on the magnetic particles contained within the oil bath which increases its viscosity. Preferably, the illustrated components are proportioned and arranged to provide a constant force travel cushioning movement of the operating rod 254.

The operating rod 254 is returned to its central position by the action of the spring 262 which is compressed during movement of the operating rod in either direction upon application of an impact, and this movement returns magnet 284 to the position of FIGURE 8 and thus reduces the magnetic effect on the oil in conduit 264 to a minimum.

Of course, either the housing 252 or operating rod 254 may be the relatively movable component with appropriate provision for mounting of the structure suggested by FIGURE 8 being provided for.

The device 310 of FIGURE 9 is a friction shoe type cushion device employing actuating rod 312 reciprocably mounted in cylinder 314 and carrying spaced friction shoe holders 316 between which is slidably mounted weight 318 that is normally disposed in the position shown by centering springs 320. Friction shoe holders 316 each carry a plurality of friction shoes 321 (mounted in slotted openings 323) that are in sliding engagement with the internal surface 322 of cylinder 314. Cylinder 314 is closed at its ends by closure plates 324 and 325, to which are secured in any suitable manner rubber cushions 326. Compression springs 327 act on the individual friction shoes to bias them to the position shown.

When operating rod 312 is suddenly driven (by an impact) through cylinder 314, for instance, to the right of FIGURE 9, the left hand side friction shoes 321 strike the sliding weight 318, which, by means of wedging surfaces 328 and 329 urges these friction shoes against the cylinder surface 322, where they remain during the energy absorption stroke of the device. The greater the impact speed, the harder the left hand shoes 322 will strike weight 318, thereby resulting in increased frictional forces opposing impact. Return may be effected by employing compression springs 330 arranged in a manner similar to that suggested in FIGURES 7 and 9. Of course, impacts in the opposite direction will be absorbed in a similar manner by right hand shoes 321 striking weight 318.

The angles of surfaces 328 and 329 are made such that they will not bind together unless the shoes are hit by weight 318, and the frictional force is substantially released on the return stroke. This may be determined in any conventional manner.

Of the three cusioning units described above, the hydraulic device of FIGURES 4–6 is preferred because of its simplicity of design and nominal cost of manufacture.

*Application of invention to railroad cars*

FIGURES 11–15 illustrate the application of my invention to a cushion body car arrangement (as distinguished from a cushion underframe arrangement). The car structure is generally indicated by reference numeral 400 and generally comprises a center sill structure 402 of the standard Z-26 type and an underframe structure 404 which is mounted for movement with respect to the center sill structure 402. Any type of car body may be mounted on underframe structure 404, whether of the boxcar, flatcar, gondola car or passenger car type. As indicated in FIGURES 11, 12 and 15, the center sill structure includes the usual Z-shaped members 406 fixed together in the customary manner and fixedly carrying a bolster structure 410 of any suitable design at each end of the car (only one of which is shown). A hand brake and uncoupling rod support 412 is also carried by each end of the center sill structure, as are the brake "AB" valve support 413 and brake reservoir supports 415; the dead lever brake arm and brake rigging may be secured to the center sill structure in any suitable manner. The center sill structure 402 carries the usual couplers (not shown) suitably mounted at each end thereof. Draft gear may also be provided, but when employing my invention, they contribute so little to protection of the car and its lading that they may be completely eliminated under ordinary circumstances.

The underframe structure 404 comprises spaced side sills 414 connected together by end cross bearer structures 416 (only one is shown) and spaced center cross bearer structures 418.

In the form shown in FIGURES 10–15, the side sill members 414 are in the form of channels in each of which is received a roller 420 (see FIGURES 10 and 14) journalled at each end of each bolster structure 410. Thus, the underframe structure 404 rides on rollers 420, which are rotatably mounted on pins 422 secured in any suitable manner to the bolster structures.

The center cross bearer members 418 may be of any suitable design, though in the illustrated form they comprise channels 430 and plates 432, 434 and 435 rigidly united to form a rigid structure that defines an opening 436 through which the center sill structure 402 extends. The end bearers are of similar construction, they being formed by channels 438 and plates 440, 442 and 443 all integrally united to define opening 444 through which the center sill structure 402 extends.

Referring to FIGURE 13, a unit 110 is employed where indicated within the center sill structure 402. The closures 122 and 123 of the hydraulic unit bear against center sill lugs 450, which at each end of a unit 110 are spaced on either side of a center lug or stop member 452 that is fixed to the respective center cross bearer structures 418 in any suitable manner. The center sill structure may be slotted as at 454 to permit the necessary travel of the center lugs or stop members 452, and carrier plates 456 secured to the bottom of the center sill structure hold the hydraulic unit in place. As seen in FIGURE 15, the ends or ridges 458 of carrier plates 456 together with guide plates 458 fixed to the respective mmebers 408 guide the hydraulic unit 110 in its contraction and extension strokes.

When the unit 110 is mounted substantially as shown in the cushion body car arrangement of FIGURES 11–15, buff and draft forces appiled to the center sill structure 402 will be cushioned to provide the results described above.

In the embodiment of FIGURES 16–19, the invention is applied to the freight handling system disclosed and claimed in the copending application of Jack E. Gutridge, Ser. No. 699,759, filed Nov. 29, 1957, now Patent No. 2,954,708, the disclosure of which is hereby incorporated by reference. Reference to this application may be had for a specific description of this freight handling system, though for purposes of this application it may be pointed out that the system of that application contemplates the use of a railroad car 500 provided with retractable brackets 502 and 504 at its rear and front ends, respectively, a highway chassis (not shown) and a freight container 506 which is separably mounted on said chassis.

The railroad car 500 is preferably provided with a fifth wheel stand where indicated at 510 for engagement with the kingpin 511 of the container.

The freight handling system of the Gutridge application contemplates that (in one arrangement therein disclosed) the freight container 506 when carried by the chassis will be backed onto the railroad car 500 when the brackets have been lowered to their operative positions (the positions of FIGURE 16). After the container is backed over both the front and rear brackets, air springs of the chassis are deflated to rest the container on the brackets after which the chassis is withdrawn from underneath the container and the fifth wheel stand 510 elevated to releasably engage the kingpin 511. Suitable locking devices are employed to lock the brackets 502 and 504 in extended and retracted positions. Blocks 513 of container 506 engage the front brackets 504 prior to the time that the fifth wheel stand is elevated to engage the kingpin and lift the front end of the container off brackets 504.

In accordance with my invention, a hydraulic cushioning device 110 is incorporated in the fifth wheel stand 510 in the manner suggested by FIGURES 18 and 19, and the rear brackets 502 are provided with rollers 512 upon which the rear end of the container rests.

As indicated in FIGURE 18, the fifth wheel stand 510 may comprise spaced trackways 514 (fixed to the bed of car 500) in which rollers 516 ride that are journalled on shafts 518 and 520, respectively. The shafts 518 journal the lower ends of vertical struts 522, while the shafts 520 journal the lower ends of telescoping diagonal struts 524, each composed of members 525 and 527 which may be secured in the retracted position of FIGURE 18 by suitable pins 526 passing through both of these members. The pins 518 and 520 are journalled in a channel-shaped housing structure 528 which is received over the hydraulic cushion unit 110 and is free to move longitudinally of trackways 514. The closure members 122 and 123 of the unit 110 are placed between spaced abutments or stop members 530 fixed to the bed of car 500 and lugs 532 carried by each end of the housing structure 528 also engage the closure members of the hydraulic unit (in the illustrated arrangement lugs 532 are fixed to angle members 533 that are in turn fixed to housing member 528).

The fifth wheel stand 510 may include a fifth wheel plate structure 534 of any suitable design that is provided with an appropriate latching device for releasably engaging the kingpin 512 of container 506. The specific fifth wheel stand 510 illustrated is adapted to be elevated and lowered by a chain secured between shaft 536 and the rear end of, for instance, the trailer chassis. The upper ends of the vertical and diagonal struts are pivotally secured to the shaft 536 somewhat as shown, and in the illustrated embodiment the fifth wheel plate structure is pivoted to links 540 in any suitable manner, links 540 being fixed to shaft 536 in the illustrated embodiment. The vertical struts may be secured together by tie plate 542 for reinforcing purposes.

Parenthetically, it may be mentioned that the specific kingpin latching device and elevating mechanism therefor illustrated are shown only for purposes of illustration, since for purposes of my invention any fifth wheel stand structure mounted for long travel cushioning movement in the manner suggested by FIGURES 18 and 19 will be satisfactory.

The rear end of the container body may be provided with angle members 544 against which the rollers 512 engage.

As indicated in FIGURE 17, rollers 512 may be rotatably mounted in any suitable manner in housing structure 550 that is pivoted to stanchion 552 between bracket lugs 559, as at 554 in any suitable manner. Pin 556 is employed between bracket lugs 559 and housing 550 to hold the brackets 502 in the retracted position of FIGURE 17, the pin 556 being applied to hole 558 as well as bracket lugs 559 to hold the brackets 502 in the position of FIGURE 16.

Brackets 504 may be of the type described in said Gutridge and Hummel application, and are shown only diagrammatically, though it may be pointed out that they comprise a shelf-like member 561 pivoted as at 563 to the respective stanchions 565 and held in either the retracted (vertical) position by suitable pins 567 passing through brackets 569 and suitable holes 571 formed in members 561 or the extended (horizontal) position in which the members 561 rest against the tops of stanchions 565.

When the container 506 is secured to and supported at its front end by the fifth wheel stand 510 and its rear end rests on rollers 512, impacts applied to the railroad car 500 will be absorbed by the hydraulic cushion device 110 in accordance with the principles described above.

When the car 500 employs a underframe arrangement of the type shown, for instance, in FIGURES 10–15, the fifth wheel stand may be merely a simple uncushioned elevatable jack or support structure, and the same beneficial results will be provided, though in addition, the car body underframe structure itself will be protected against longitudinal impacts.

In the showing of FIGURE 20, semi-trailer 560 is shown applied to car 500 (brackets 504 not being shown for clarity of illustration); the semi-trailer kingpin is secured to the fifth wheel stand 510, which, of course, is proportioned to raise body 560 off its landing gear in the position shown; stand 510 includes the cushioning arrangements shown in FIGURES 18 and 19, and front and rear brackets 502 and 504 are locked in their inoperative positions for piggyback service.

The semi-trailer 560 may be positioned on the railroad car 500 in acccordance with standard piggyback practice, and suitable provision may be made for guiding movement of the trailer 560 with respect to car 500 during the absorption of impacts (such as guide rails 579) as well as for securing the rear end of the trailer to the railroad car.

*Scope of invention*

Although the range of long cushion travel contemplated by this invention is applicable to all types of vehicles, including passenger and freight railroad cars, highway trucks and even passenger automobiles, the invention is of most striking significance with regard to railroad freight cars and the protection of their lading, and specifically the resilient type of lading that has been responsible for such a high proportion of damage claim payments. However, in considering railroad freight cars, it should be borne in mind that not only piggyback service or container service as well as other types of freight cars used for lot as distinguished from bulk shipments.

It should also be borne in mind that the cushioning mechanism employed may be interposed between a longitudinally slidable center sill arrangement and the coacting underframe, or between the coupler and the underframe, or between the underframe and a body slidably mounted thereon, or between the car body and a container load, such, for example, as employing the long travel cushioning mechanism in conjunction with the fifth wheel stand that supports the semi-trailer in piggyback fashion on a flatcar.

The essence of the present invention is that the impulse applied to a railroad car and its lading due to impacts is applied to the car and its lading over a time period that is sufficiently prolonged to not only enable the lading to become fully compacted but to also keep lading forces at safe maximums. The invention necessarily contemplates that the impulse will be fully applied to the lading by the time that the struck car on which the lading is carried reaches its ultimate velocity. This principle is specifically applicable to resilient type lading hereindescribed, but when employed for protecting all types of freight will result in substantial reductions in damage during transit.

In dealing with bodies having masses on the order of those found in the railroad industry, the cushioned travel should be on the order of thirty inches, but for any specific problem, the actual travel necessary will depend upon the masses of the bodies involved and their relative velocities on impact.

Although the data on which the curves of FIGURES 1–3 are based was taken from tests employing a moving striking car and a stationary struck car that was free to move after impact, the range of long cushioned travel indicated necessary by these tests will apply in general to all instances in railroad transportation where resilient lading is subjected to longitudinal shocks. For instance, if the struck car is held against movement by the train of cars of which it forms a part (as is the usual case in humping yards), the frequency response of the lading may change somewhat, but the resulting lading force and coupler force curves would have substantially the same relationship, particularly in view of the flexibility of the couplings between the cars. In instances where the struck car is positioned against a rigid abutment, or the striking car impacts against a rigid abutment, a similar lading force and coupler force curve relationship will be found to exist, though slightly longer travel may be necessary to adequately protect resilient lading than would be required under the conditions forming the basis for FIGURES 1–3. However, regardless of the particular nature of the impact for a maximum of 10 m.p.h. impact speeds the range of twenty to forty inches of cushioned travel will insure adequate protection for resilient lading in the railroad transportation field.

While lading protection can be achieved by either long travel cushioning alone, as contemplated by this invention, or by various combinations of compartmentation and shorter travel cushioning, elimination of compartmentization is desirable. If both cushioning and compartmentation are employed to achieve lading protection with relatively short travel, there are two large first costs that must be met as high coupler forces with attendant car damage and the consequent heavy construction requirements remain even though cushioning requirements may be small. Long travel cushioning on the order contemplated by me eliminates the need for compartmentation while making possible low coupler forces on impact, thus making possible the use of a lighter, more inexpensive car construction. Also, load stowage and bracing problems are materially reduced, if not eliminated.

Furthermore, the matter of accentuating the inherent friction of resilient lading illustrated in FIGURE 3a will materially increase the effectiveness of the cushioning employed, though it is not required where long cushion travel on the order contemplated by me is adopted.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A coupler impact cushioning device for railroad cars; said device being disposed in a horizontal position extending longitudinally of the car and interposed between the car couplers and a load support carried by the car and mounted for movement longitudinally of same, said device comprising a cylinder member, a plunger member reciprocably mounted in said cylinder member for movement in either direction longitudinally of said cylinder member, means interposed between and cooperating with said cylinder member and said plunger member for effecting a substantially constant force-travel relative movement between said members when one of said members moves relative to the other of said members under the impetus of coupler impacts, means for making one of said members fast with respect to the load support carried by the car, means for transmitting buff and draft forces applied to the couplers to the other of said members, means for restoring said members to recentered position after coupler buff and draft forces have been cushioned, said plunger member comprising an operating rod extending through opposite ends of said cylinder member and a piston head affixed to the midportion of said rod, conduit means connecting opposite ends of said cylinder member for permitting fluid flow therebetween, with said cylinder member and said conduit means being fully charged with hydraulic liquid admixed with magnetizable pulverant material, magnetic means operably associated with said conduit means for magnetizing said material, and means for varying the magnetizing action of said magnetic means on said pulverant material in said conduit means in accordance with relative movement between said operating rod and said cylinder member to achieve said constant force-travel relative movement between said members, said varying means including means for sensing relative movement between said operating rod and said cylinder member and means for varying said magnetizing action in accordance with said relative movement between said operating rod and said cylinder member to achieve said constant force travel relative movement, said piston head, said conduit means, said liquid, said material, said magnetic means, and said varying means comprising said constant force-travel effecting means.

2. A coupler impact cushioning device for railroad cars and adapted to be disposed in a horizontal position extending logitudinally of the car and between the car couplers and the load carrier by the car, said device comprising a cylinder member, a plunger member reciprocably mounted in said cylinder member for movement in either direction longitudinally of said cylinder member, means interposed between and cooperating with said cylinder member and said plunger member for effecting a substantially constant force-travel relative movement between said members when one of said members moves relative to the other of said members under the impetus of coupler impacts, means for coupling one of said members with respect to the load carried by the car, means for subjecting the other of said members to the impetus of coupler impacts, means for restoring said members to recentered position after coupler impacts have been cushioned, said plunger member comprising an operating rod extending through opposite ends of said cylinder member, said operating rod operably carrying unidirectionally acting friction shoe assembly means on either side of the midportion of said cylinder member for dissipating the impetus of coupler impacts through friction, said friction shoe assembly means being keyed to said operating rod for movement therewith with respect to said cylinder member with the respective assembly means being oppositely operative, and including means for wedging the respective friction shoe assembly means against the inner surface of said cylinder member during coupler impacts as required to effect said constant force-travel relative movement between said members in either direction of said movement comprising a weight member shiftably mounted on said operating rod between the respective friction shoe assembly means and resilient means operatively interposed between the respective friction shoe assembly means and said weight member, said friction shoe assembly means including friction shoes defining friction surface means for providing a substantially constant cushion force for each increment of relative movement between said plunger member and said cylinder member, said friction shoe assembly means and said wedging means comprising said constant force-travel effecting means.

References Cited

UNITED STATES PATENTS

| | | | |
|---|---|---|---|
| 2,040,486 | 5/1936 | Kellett | 105—392.5 |
| 2,047,955 | 7/1936 | Fitch | 105—392.5 |
| 2,256,024 | 9/1941 | Hill | 214—10.5 |
| 2,330,706 | 9/1943 | Hankins et al. | 213—8 |
| 2,590,406 | 3/1952 | Haas | 213—43 |
| 2,613,819 | 10/1952 | Fillion | 213—8 |
| 2,702,642 | 2/1955 | Bensinger | 214—10.5 |
| 2,820,471 | 1/1958 | Crowell. | |
| 2,909,291 | 10/1959 | Gibson | 213—43 |
| 2,973,969 | 3/1961 | Thall | 188—88 |

FOREIGN PATENTS

| | | |
|---|---|---|
| 1,061,685 | 10/1951 | France. |
| 241,033 | 10/1925 | Great Britain. |
| 704,084 | 2/1954 | Great Britain. |

ARTHUR L. LA POINT, *Primary Examiner.*

LEO QUACKENBUSH, *Examiner.*

D. E. HOFFMAN, D. FAUST, *Assistant Examiners.*